Sept. 8, 1942.　　　　A. C. HOPKINS　　　　2,295,472
ROAD SANDING APPARATUS
Filed Jan. 30, 1941　　　　2 Sheets-Sheet 1
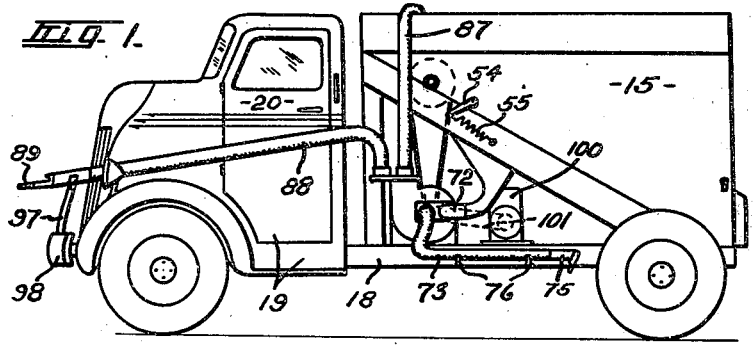
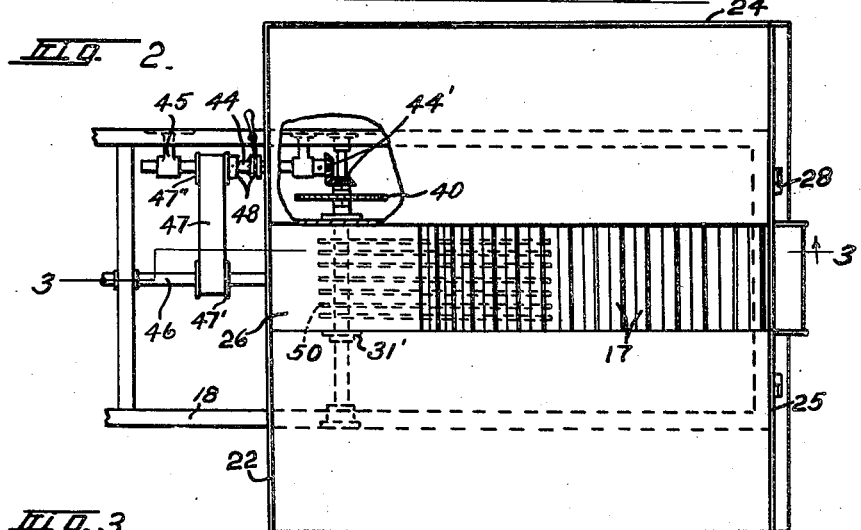
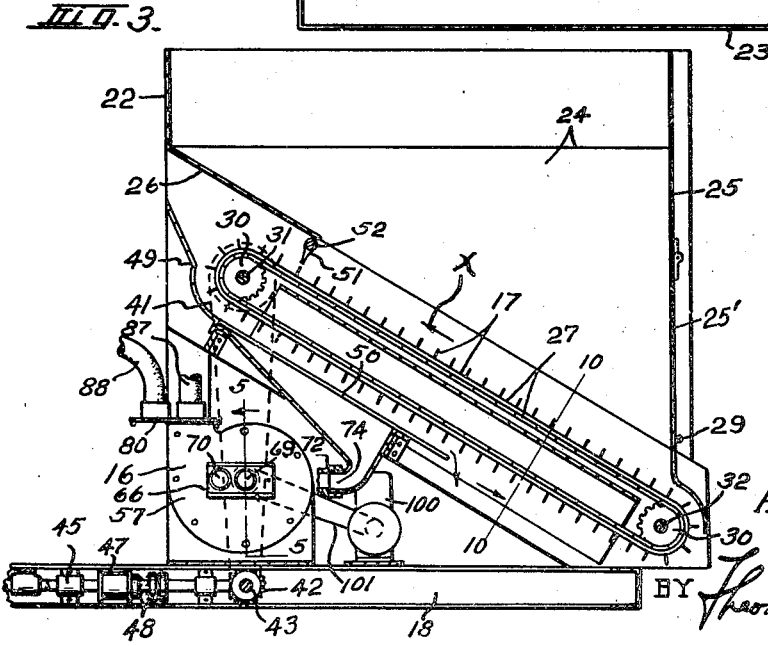
INVENTOR
ARTHUR C. HOPKINS
BY Theodore E. Simonton
ATTORNEY Sept. 8, 1942. A. C. HOPKINS 2,295,472
ROAD SANDING APPARATUS
Filed Jan. 30, 1941 2 Sheets-Sheet 2
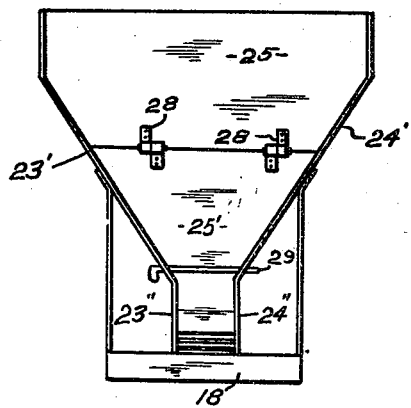
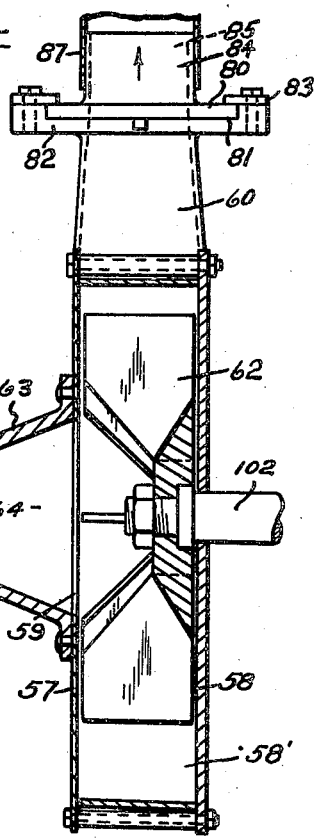
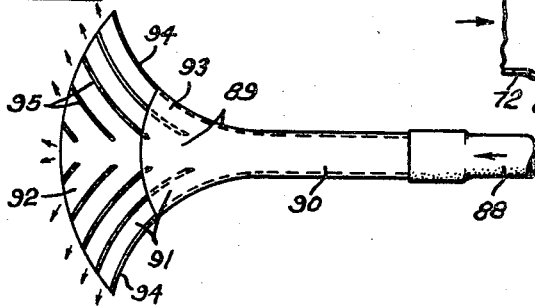
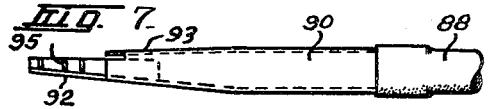
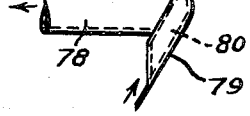
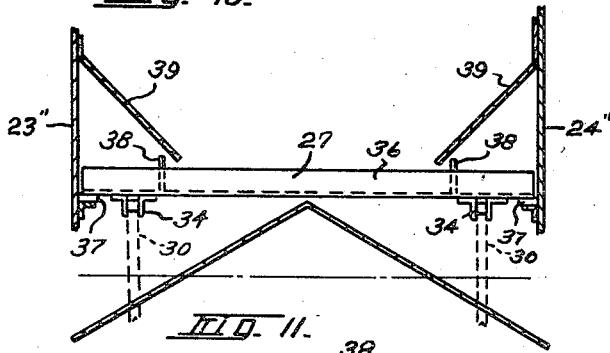
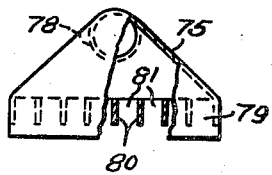
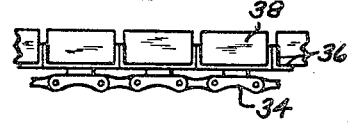
INVENTOR
ARTHUR C. HOPKINS
BY *Theodore E. Simonton*
ATTORNEY Patented Sept. 8, 1942

2,295,472

UNITED STATES PATENT OFFICE 2,295,472

ROAD SANDING APPARATUS

Arthur C. Hopkins, Tupper Lake, N. Y., assignor to Artomatic Machinery Corp., Tupper Lake, N. Y., a corporation of New York Application January 30, 1941, Serial No. 376,673

6 Claims. (Cl. 275—2)

This invention relates to improvements in a road sanding apparatus.

The primary object of this invention is to provide an apparatus adapted to be mounted on the chassis of a motor truck which will rapidly and evenly spread sand, cinders, or other suitable material on highways, airport runways, military parade or drill fields or parade grounds, etc., to improve the traction of the wheels of motor driven vehicles thereon.

A more specific object of this invention is to provide an apparatus of the above mentioned character which may be utilized to load the material into the body of the truck or other vehicle as well as to take the material from the body and distribute same on the highway.

Another object of this invention is to produce a road sanding apparatus which will function to distribute the sanding material in proportion to the speed of travel of the apparatus along the highway.

In carrying out the above mentioned objects I have produced a pneumatic loading and unloading apparatus adapted to be mounted on the chassis of a motor truck and which comprises a blower or impeller actuated at a pre-determined speed independently of that of the speed of operation of the truck. This impeller is arranged to receive the sanding or other material from a hopper or truck body and force it through a suitable nozzle for spreading the same upon the highway. Furthermore, I have provided a practical and efficient conveyor which is operated in proportion to the speed of travel of the truck along the highway for transferring material from the hopper or truck body to the blower or impeller.

A further object of the invention is to provide the blower or impeller with a simple and efficient valve means for controlling the travel of the material to and from the blower whereby said blower or impeller may be utilized to load the hopper or truck body as well as to unload the hopper or body and distribute or spread the sanding material on the highway.

A still further object of the invention is to produce a device of the above mentioned character which is economical, dependable, and efficient in operation and which is simple and durable in construction.

I attain these objects by the mechanism illustrated in the accompanying drawings in which:

Figure 1 is a side elevation of my novel sanding apparatus showing the same mounted on a truck chassis.

Figure 2 is a top plan of the apparatus illustrated in Figure 1 on an enlarged scale, the forward portion of the truck and a section of the hopper or truck body being shown broken away.

Figure 3 is a longitudinal sectional view taken substantially in the plane of the line 3—3, Figure 2.

Figure 4 is a rear view of the truck body or hopper shown in Figure 1.

Figure 5 is an enlarged vertical sectional view through the blower taken substantially on line 5—5, Figure 3.

Figure 6 is an enlarged plan view of my novel distributing nozzle.

Figure 7 is a side elevation of the nozzle illustrated in Figure 6.

Figure 8 is a side elevation of an intake nozzle particularly adapted to be used in conjunction with my blower apparatus when utilizing the same to load the hopper or truck body.

Figure 9 is an end view partly in section, of the nozzle illustrated in Figure 8.

Figure 10 is a detail transverse sectional view of the truck body or hopper taken on line 10—10, Figure 3.

Figure 11 is a fragmentary side elevation of the conveyor belt.

As shown in the drawings, my novel sanding apparatus comprises primarily a hopper or truck body 15, an impeller or blower 16, and a conveyor 17 for transferring the material contained in the hopper 15 to the impeller 16.

The hopper 15 is a rectangular box-like member mounted in any suitable manner upon the chassis or frame 18 of a truck 19 at the rear of the cab 20, as indicated in Figure 1. The hopper 15 comprises a relatively short front end wall 22, opposite side walls 23 and 24, and a rear end wall 25. The hopper is also provided with a relatively short bottom wall 26 which, as indicated in Figure 3, extends from the front wall 22 downwardly and rearwardly. The side walls 23 and 24 of the hopper have the central portions 23' and 24' thereof inclined downwardly and inwardly toward each other as indicated in Figure 4, while the upper and lower portions of these side walls extend in substantially vertical parallel planes. The lower vertical portions 23'' and 24'' of the side walls are spaced from each other a distance substantially equal or slightly greater than the width of the belt 27 of the conveyor 17 so as to permit said conveyor belt to freely operate between these side wall portions as indicated in Figure 10. The hopper 15 is preferably constructed with the upper side thereof open, while the rear end of said hopper is provided with a suitable door 25' hingedly connected as at 28 to the rear end wall 25 and conforms in general outline substantially to that of the adjacent portion of the rear end of the hopper. Any suitable means may be provided for maintaining the door 27 in a closed position, such as the latch bar 29 having the ends thereof secured in the adjacent side portions 23' and 24' of the side walls 23 and 24.

The conveyor 17 comprises the herebefore mentioned conveyor belt 26, two sets of sprocket wheels 30 mounted on shafts 31 and 32 respectively. The shaft 31 is journaled in suitable bearings 31' secured to the side walls 23 and 24 adjacent the forward end of the hopper 15 while the other shaft 32 is mounted in similar bearings connected to the hopper adjacent the rear end thereof. The conveyor belt 27 in this instance comprises a pair of endless sprocket chains 34 adapted to travel over the sprocket wheels 30. Secured to the chains 34 are a multiplicity of channel bars 36 which extend transversely of the hopper 15 with the ends thereof terminating a short distance beyond the corresponding chains 34. The lower portions 23'' and 24'' of the side walls of the hopper 15 may, as shown in Figure 10, be provided with guide plates 37 extending inwardly therefrom beneath the bars 36 positioned at the upper run of the belt for supporting said belt intermediate the sprocket wheels 30. Each channel bar 36 has a pair of vertically disposed end plates 38 secured thereto in inwardly spaced relation to the outer ends of the bar for confining the material conveyed by said belt at the central portions of the channel bars. As indicated in Figure 10, the hopper 15 is preferably provided with deflector plates 39 extending along the inner side of each side wall 23 and 24 with the lower edges thereof extending over the channel bars 36 in inward spaced relation to the end plates 38 for guiding the material contained in the hopper to the conveyor intermediate said end plates.

The conveyor 17 is driven, in this instance, by means of a sprocket wheel 40 secured to the outer end of the shaft 31 and which is connected by a suitable chain 41 with a similar sprocket 42 secured to an intermediate shaft 43 journaled in suitable bearings provided on the chassis or frame 18 of the truck as indicated in Figures 2 and 3. The shaft 43 is driven, in this instance, by a pair of bevel gears 44' one of which is secured to the shaft 43 and the other one to a countershaft 44 extending longitudinally of the frame 18 adjacent one side thereof as shown in Figures 2 and 3. The countershaft 44 is shown journaled in suitable bearings 45 secured to the adjacent side of the frame 18 and this shaft is driven from the propeller shaft 46 of the truck by means of a belt 47 trained over a pair of pulleys 47' and 47'' operatively connected, one to the propeller shaft 46 and the other to the countershaft 44. A suitable clutch 48 may as indicated in Figure 2 be mounted on the shaft 44 for operatively connecting and disconnecting said shaft with the pulley 47'' mounted thereon. When a clutch 48 is employed, the pulley 47'' is, of course, rotatably mounted on shaft 44.

The connections just described between the conveyor drive shaft 31 and the propeller shaft 46 of the truck are such that when the truck is driven in a forward direction, the upper run of the conveyor belt 27 is driven from the rear end of the truck toward the forward end thereof as indicated by the arrow x in Figure 3; so that material contained in the hopper 15 engaged by the conveyor will be carried upwardly over the shaft 31 and then deposited in a suitable chute 49 secured to the forward portion of the hopper 15 intermediate the side walls 23 and 24. This chute 49 extends from the forward end of the hopper in a plane above the shaft 31 downwardly and rearwardly beneath the conveyor 17 as indicated in Figure 3.

The upper side of chute 49 is preferably provided with a screen 50 formed in this instance of relatively narrow slats which are inclined downwardly from a position beneath the shaft 31 to a position rearwardly of the chute 49. These slats are spaced apart a relatively short distance so as to permit relatively fine particles of material to pass between them while coarse material such as stones, frozen portions of the sand, cinders, or the like are carried over the chute and dropped at the rear thereof and thereby be prevented from entering the impeller 16. A damper 51 may, as shown in Figure 3, be mounted above the conveyor 17 adjacent the inner or rear end of the bottom 26 for controlling the amount of material being carried forwardly by the conveyor 17. This damper is in the form of a blade extending transversely of the sides 23'' and 24'' of the hopper 15 and which is secured at the upper longitudinal side thereof to a shaft 52. This shaft is journaled at its ends in the sides of the hopper and has an arm 54 secured to one end thereof to which is connected a spring 55 that normally maintains the damper 51 in operative position substantially normal to the upper run of the conveyor 17. Spring 55 provides for forward swinging movement of the damper and thus provides for relatively large stone or frozen portions of sand to be carried forwardly by the conveyor 17 beneath said damper.

The impeller or blower 16 comprises a casing 57 provided with an impeller chamber 58 having an inlet opening 59 at its center and a volute 58' surrounding the impeller chamber and provided with an upright discharge passage 60 leading therefrom. A vane impeller 62 is mounted in the pump chamber 58 to rotate about an axis in line with the inlet opening 59. A casting 63 secured to the side of the casing 57 provides an inlet passage 64 in communication with the inlet opening 59 of the impeller. The casting 63 is provided with an outwardly extending flange 65 adjacent the outer end thereof to which is slidably mounted a damper plate 66 mounted in a groove 67 provided in the outer face of the flange 65, said plate being slidably maintained in said groove by gibs 68. The plate 66 is provided, in this instance, with two openings 69 and 70 arranged in spaced relation to each other longitudinally of the plate and which are adapted to alternately register with the inlet passage 64 upon longitudinal movement of the plate with respect to the casting 63. The plate is provided with a pair of cylindrical projections surrounding the openings 69 and 70 to which is attached flexible hose or conduits 72 and 73 respectively. One of the conduits 72 extends from the damper plate 66 and is connected to a spout 74 provided on the chute 49 at the lower inner end thereof. The other hose 73 extends outwardly from the damper plate 66 and has secured to the outer end thereof an intake nozzle 75. The hose or flexible conduit 73 when not in use may, as indicated in Figure 1, be carried on suitable brackets 76 provided on the side of the truck 19.

The intake nozzle 75 as shown in Figures 8 and 9 is preferably provided with a tubular body portion 78 having the hose or conduit 73 connected with one end thereof. The other end of the body portion 78 is connected with a fan-shaped tubular mouth portion 79 arranged in angular relation to said body portion. This mouth portion 79 is preferably provided with a plurality of inwardly extending plates 80 which are arranged in spaced relation to each other transversely of the portion 79 to provide relatively narrow inlet openings or passages 81 for correspondingly controlling the size of solid objects entering the nozzle.

The discharge passage 60 of the impeller is likewise provided with a damper plate, as 80, which is slidably mounted in a recess 81 provided in a flange member 82 connected with the pump casing at said discharge opening. The damper plate 80 is maintained in the recess 81 for sliding movement by means of a pair of gibs 83 secured to said flange member. The plate 80 is provided with a pair of tubular members 84 extending outwardly therefrom in spaced relation to each other longitudinally of the plate. These tubular members register with corresponding openings in the plate which provide two outlet passages 85 adapted to alternately register with the discharge opening 60 as the plate 80 is moved back and forth through the recess 81.

A hose or flexible conduit 87 is connected with one of the tubular members 84 to extend upwardly therefrom over the top of the hopper 15 to the interior thereof as indicated in Figure 1. A flexible conduit or hose 88 is connected with the other tubular portion 84 of the plate 80 and is adapted to extend forwardly along the side of the cab 29 of the truck 19 to a position at the forward end of said truck where it is connected with an exhaust nozzle 89.

This exhaust nozzle 89 as shown more particularly in Figures 6 and 7, comprises a tubular body portion 90 which is connected at one end to the hose 88. The opposite end of the body portion 90 extends outwardly at diametrically opposite sides thereof to provide a fan-shaped mouth portion 91. This mouth portion 91 is more or less rectangular in cross section and is provided with a bottom wall 92, a top wall 93, and arcuately disposed side walls 94. The top wall 93 preferably terminates in inwardly spaced relation to the plane of the forward edge of the bottom wall 92 so as to provide an opening through which air may escape to relieve the air pressure upon the sanding material just prior to the passing of such material from the nozzle so as to limit or govern the degree of spread of the material. A plurality of fins 95 may as shown be secured to the bottom wall 92 to aid in separating and distributing the sanding material. These fins extend inwardly from the bottom 92 and are arranged at opposite sides of the longitudinal center of the nozzle in more or less concentric relation with the adjacent side wall 94. The inner ends of these fins may as shown in Figure 6 terminate in spaced relation to the longitudinal center plane of the nozzle with the outer shorter fins terminating nearer the longitudinal plane of the nozzle than the inner ends of the outer fins do. It will be understood that the number and arrangement of the fins may be varied as desired and that the spacing of the forward edge of the upper wall 93 with respect to that of the bottom wall 92 may be changed as desired depending upon the material being discharged through the nozzle and the air pressure produced by the impeller 57. Furthermore, it will be understood that the bottom and top walls 92 and 93 of the nozzle 89 may terminate in substantially the same plane and a suitable opening or slot be provided in one or both of the walls to reduce the air pressure on the sanding material.

Any suitable means may be provided for supporting the exhaust nozzle 89 at the forward end of the truck such as a bracket 97 secured to the body portion 90 of the nozzle and to a convenient portion of the truck such as the front bumper 98 as indicated in Figure 1.

In operation, when it is desired to load the hopper 15, the valve plates 66 and 80 are adjusted, if necessary, to bring the flexible conduits or hose 73 and 87 into communication with the inlet opening 59 and outlet opening 60 respectively of the impeller 57. The impeller 62 is then caused to operate by any suitable means such as a small gas engine or motor 100 mounted on the truck chassis and which may be connected as by a belt 101 to the shaft 102 of the impeller. Rotation of the impeller or fan 62 produces a suction through the pipe 73 and by raking or drawing the intake nozzle 75 over a pile of material such as sand, cinders or the like to be loaded into the hopper 15, this material will be drawn upwardly through the conduit 73 into the impeller and thence forced through the discharge passage 60 and conduit 87 to the interior of the hopper. At the end of the loading operation the damper plates 66 and 80 are adjusted so as to bring the conduits 72 and 88 into communication with the inlet and outlet passages respectively of the impeller and thereby move conduits 73 and 87 out of communication with these passages. The truck may now be driven along the highway and the material spread over said highway during the movement of the truck by operating the impeller through the medium of the motor 100 and the conveyor 17 by connecting pulley 47" with the shaft 44 through the medium of the clutch 48. It will be observed that the impeller is operated at a constant, preferably high, speed; while the conveyor 17 is operated at a speed which is proportionate to the speed of travel of the truck over the highway due to said conveyor being driven by the propeller shaft 46 of the truck. It is thus seen that when the truck is operated at a relatively high speed, the sanding material will be delivered at a more rapid rate to the impeller and highway than when the truck is operating at a relatively slow rate of speed. It therefore follows that a substantially uniform amount of material will be supplied to the highway under all operating conditions of the truck. Furthermore, it will be obvious that due to the particular construction of the hopper 15 and operation of the conveyor 17, the sanding of highways by my novel apparatus may be accomplished with a minimum amount of labor inasmuch as it requires only one person who operates the truck.

Although I have shown and particularly described the preferred embodiment of my invention, I do not wish to be limited to the specific construction shown, as various changes both in the form and arrangement of the parts thereof may be made without departing from the spirit of the invention as set forth in the appended claims.

I claim:

1. In a road sanding apparatus of the character described, a hopper; an impeller having intake and outlet passages; a valve member having a pair of openings therethrough; an intake conduit connected with one of said openings; means including a second conduit connecting the second one of said openings with the hopper, said valve means being movably connected with said impeller to alternately bring said openings into registration with the intake passage; and means for operating said impeller.

2. In a road sanding apparatus of the character described; a hopper; an impeller having intake and outlet passages; intake and discharge nozzles; means including conduits for connecting the intake passage of the impeller with the hopper and with the intake nozzle, separate conduit means connecting the outlet passage of the impeller with the interior of the hopper and with said discharge nozzle; and valve means associated with said intake and outlet passages for controlling the passage of material through said conduits.

3. In a road sanding apparatus of the character described, a hopper; a discharge nozzle; and means including a fan blower for forcing material from the hopper through said nozzle, said nozzle having a fan-shaped mouth portion provided with arcuate fins therein for directing the material laterally, said nozzle being also provided with an opening in one side thereof intermediate the ends of the fins for relieving the air pressure.

4. A discharge nozzle for a road sanding apparatus, or the like, wherein material is discharged therethrough by air under pressure, said nozzle comprising a fan-shaped mouth portion having a plurality of arcuate fins connected with the upper and lower side walls thereof, said fins extending inwardly from the outer end of said portion for dividing the same into a plurality of outwardly diverging passages, one of said side walls being terminated short of the outer end of said mouth portion to provide an opening at said side spaced inwardly from the outer ends of the fins for relieving the air pressure.

5. A road sanding apparatus comprising, in combination, a motor truck having a hopper-like body mounted on the chassis thereof in fixed relation with respect thereto, said body having a discharge opening in its lower side, an endless belt conveyor mounted beneath the body to extend longitudinally of the truck in cooperative relation with said body for receiving the material passing therefrom through said discharge opening and carrying the same forwardly therefrom to a position intermediate said opening and the front end of the truck, means including a power take-off actuated by the truck motor for operating the conveyor in accordance with the speed of travel of the truck, a vane impeller mounted on the truck adjacent the forward discharge end of the conveyor, a discharge nozzle secured to said truck adjacent the forward end thereof, conveying means operatively connecting the intake passage of the impeller with the discharge end of the conveyor, separate conveying means operatively connecting the outlet passage of the impeller with said discharge nozzle, and power means for operating said impeller independently of the operation of the truck and of said conveyor for drawing the material through said first mentioned conveying means into said impeller and forcing the same through the second conveying means and out through said nozzle.

6. A road sanding apparatus as defined in claim 5, wherein a damper member is hingedly mounted over the conveyor adjacent the forward end of the discharge opening to swing from a normal position in close proximity to said conveyor to a position more or less remote therefrom, and means yieldingly maintaining the damper in said normal position for controlling the quantity of the material being carried by said conveyor.

ARTHUR C. HOPKINS.